United States Patent
Cooper et al.

(10) Patent No.: US 6,352,669 B1
(45) Date of Patent: Mar. 5, 2002

(54) METHOD FOR SINTERING MECHANISMS

(75) Inventors: Alexander Cooper, Lafayette; Friedrich Prinz, Woodside, both of CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/426,085

(22) Filed: Oct. 22, 1999

Related U.S. Application Data

(60) Provisional application No. 60/105,265, filed on Oct. 22, 1998.

(51) Int. Cl.[7] .............................................. C04B 33/32
(52) U.S. Cl. ...................... 264/608; 264/607; 264/645; 264/670; 264/671; 264/672; 264/678
(58) Field of Search ................................ 264/607, 645, 264/670, 671, 608, 672, 678

(56) References Cited

U.S. PATENT DOCUMENTS

| | | | | | |
|---|---|---|---|---|---|
| 1,513,617 A | * | 10/1924 | Litt | ............................. | 264/670 |
| 4,424,022 A | * | 1/1984 | Herrold | ........................ | 432/258 |
| 4,786,542 A | * | 11/1988 | Yasuda et al. | .............. | 428/116 |
| 5,340,510 A | * | 8/1994 | Bowen | ..................... | 264/328.2 |

* cited by examiner

Primary Examiner—James Derrington
(74) Attorney, Agent, or Firm—Lumen Intellectual Property Service, Inc.

(57) ABSTRACT

The invention utilizes green support structures during sintering to maintain the shape, reduce sagging and prevent separate part sections from coming into contact and fusing together during the sintering process. In the most preferred embodiment, monolithic green structures are form with integrated support green structures that are released from the parts after sintering. Preferably monolithic green structures are formed by the Mold Shape Deposition Manufacturing (Mold SDM) process. By the method described, complex sintered structures can be made having interlocking and independently movable interlocking parts.

7 Claims, 6 Drawing Sheets

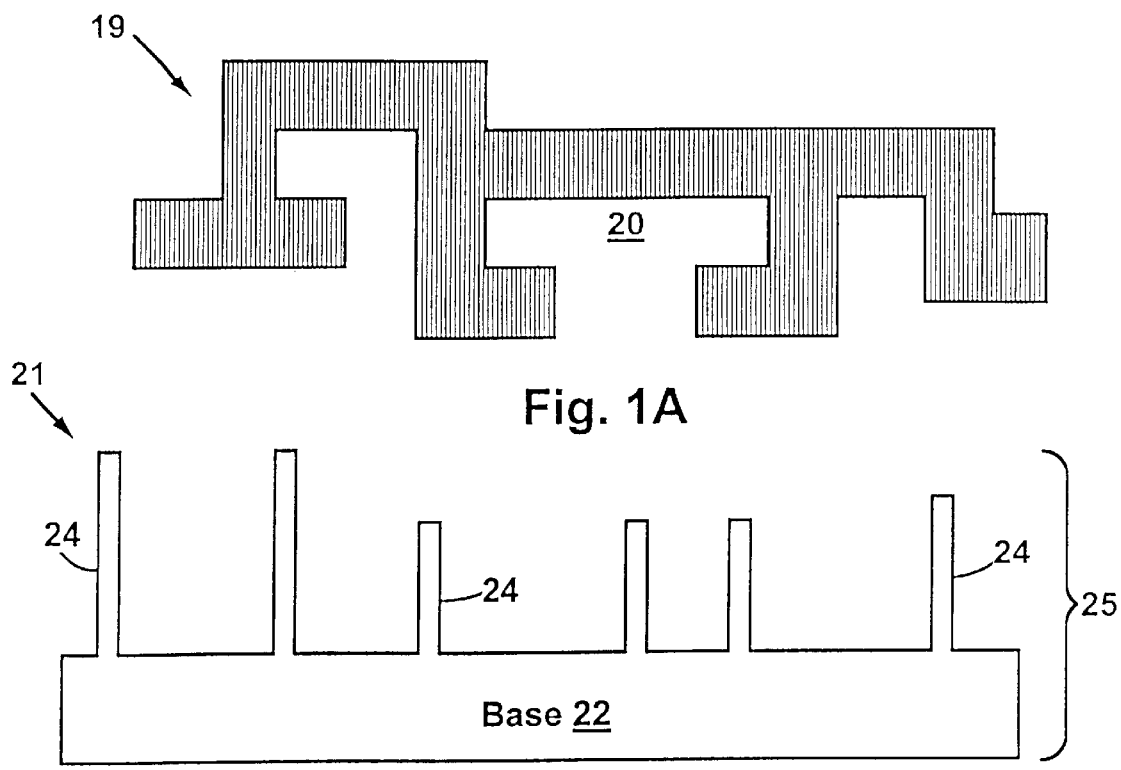
Fig. 1A
Fig. 1B
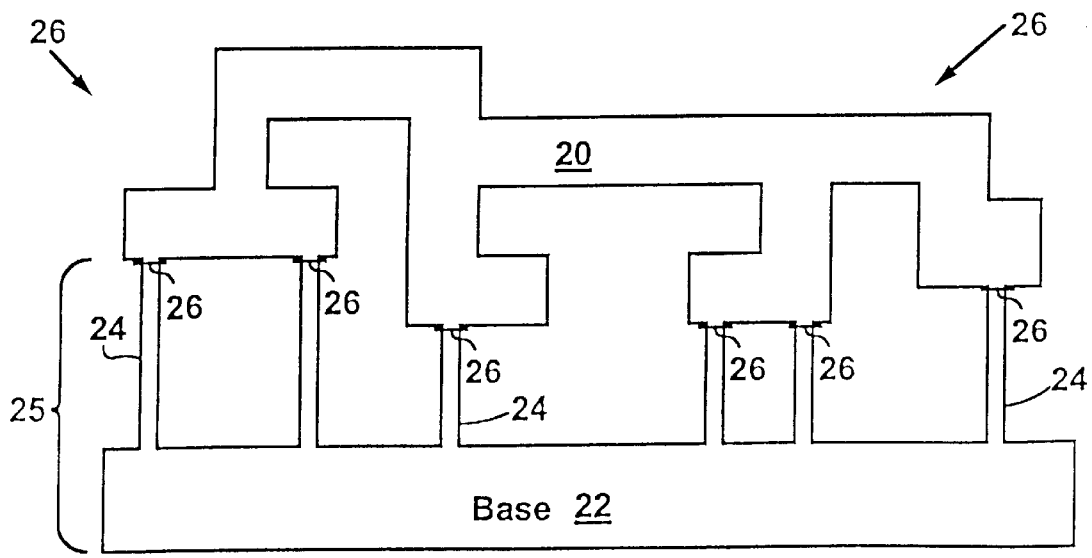
Fig. 2

METHOD FOR SINTERING MECHANISMS

RELATED APPLICATIONS

This application is related to copending patent application 60/105,265 filed Oct. 22, 1998 which is hereby incorporated by reference.

This invention was supported in part by grant number N00014-96-1-0625 from the Defense Advanced Research Projects Agency (DARPA). The Government has certain rights in the invention.

FIELD OF THE INVENTION

This invention relates generally to sintering of ceramic and metal parts. More particularly, it relates to a method of sintering parts that preserves the alignment of complex structures and prevents separate part sections from fusing together during sintering. This method can be used to sinter pre-assembled mechanisms consisting of interlocking sections such that the sections do not fuse together during the sintering process and render the mechanism inoperable.

BACKGROUND

Parts can be made from a variety of ceramic and metallic materials using powder based processes. The powdered material is combined with a binder and formed into a shape. The binder serves to hold the powder particles together and gives the formed part sufficient mechanical strength that it will maintain its shape. The part is referred to as a "green" part. Green parts typically consist of approximately 50% by volume of powder particles, the rest being binder and air. Green parts typically have relatively low mechanical strength. After forming the green part, a burnout process, at temperatures typically up to about 600 C, is used to remove the binder material from the green part and begin fusing the powder particles together. Sintering is the final step where the powder particles are fused together at high temperature, typically at above 1500 C for ceramic materials. After sintering the parts are typically between 95 and 100% dense and are mechanically strong.

A typical green part has up to 50% by volume of air and binder. During sintering the part undergoes a significant amount of shrinkage and also becomes soft. Because the shrinkage may not be uniform and/or because the part may not be supported properly, the part may deform from its original shape or sag. Further, adjacent green parts may shift such that they make contact with one another and fuse together. Because of the shrinking, sagging and shifting, described above it is difficult to sinter complex green structures having more than one green part where the parts are in close proximity. Further, using conventional sintering processes it is extremely difficult to sinter complex green structures formed with independent interlocking and interlocking movable parts without the parts fusing together. This is particularly difficult for parts separated by small gaps.

Prior Art:

To help prevent the distortion of green structures during sintering, some processes use extended supports to hold up projecting regions of the structure. While extended supports, do reduce sagging of the structure during sintering, because the extended structures do not experience the same rate and amount of shrinkage as the green material, the shape of the structure may still be distorted during sintering. Block supports are also used, but block supports only support base portions of the green structure and do not provide uniform support to the entire green structure during sintering. Support structures with a combination of a base support and extended supports can be used to support complex green structures, but again the unequal shrinkage between the green structures and the supporting structures is still problematic for retaining the shapes of parts and alignments between multiple parts.

Powder beds have been used to provide more uniform support for complex green structures during sintering. When a powder bed is used, the green structure is buried or partially buried in a powder, which acts to support individual parts of the structure during sintering. Because the powder bed is not rigid it allows the parts to shrink during sintering while still providing support. Powder beds provide one of the best methods known in the prior art to support complex green structures during sintering and yet there are still several shortcomings.

Because the powder bed is compliant it will not prevent warpage or distortion during sintering. It primarily reduces sagging due to gravity by supporting the undersides of parts. Powder beds are also not suitable for use in sintering mechanisms for two main reasons. First, in cases where there are small gaps between mechanism sections, for example in joints, it is very difficult to manually align the sections such that they are not touching while also placing the powder around them. It is also very difficult to place powder into the narrow gaps to prevent contact between the sections. In many cases, because of the joint design, it will also not be possible to inspect the joint to ensure that the two sections are not touching and that there is powder between the sections. Second, because the powder bed is compliant it may allow mechanism sections to come into contact as a result of movement caused by shrinkage during the sintering process. If mechanism sections come into contact they may fuse together and render the mechanism inoperative.

With the current developments in rapid prototyping very complex green structures can be fabricated. These complex green structures may consist of a number of interlocking sections and may contain internal cavities and regions. When these complex green structures are sintered, it is extremely problematic to keep the individual sections aligned using methods described in the prior art. In view of the above mentioned shortcomings with the prior art methods, what is needed is a general method for sintering green parts which preserves the shape of the part and reduces sagging during sintering. Further, what is needed is a method for sintering complex green structures which preserves the alignment of the individual parts within the complex green structures.

SUMMARY OF THE INVENTION

It is a primary object of the present invention to provide support structures that support green parts during sintering which help preserve the shape of the part. It is a further object of the present invention to provide a method of sintering complex green structures with a plurality of green parts, which preserves alignment of the green parts during the sintering process.

In the method of the invention, the green parts or green structures and the support structures are preferably both made from the same green material, such as a ceramic or metallic powder with an appropriate binder. Because the green parts and the supports are made of the same material they exhibit similar degrees of shrinkage during sintering which helps to prevent shifting and sagging of the part during sintering.

For the fabrication of a structure, the green parts and the support structure are preferably formed in a single process, such that the green parts and the support structure are a monolithic piece of green material. The monolithic green structure is formed by any suitable method known in the art such as injection molding or Shape Deposition Manufacturing, whereby the structure is built-up by sequential deposition of layers.

The support structure preferably has a base to provide stabilization with elongated support fixtures extending from the base to the structure. After the green support structure and the green parts are sintered, the support structure is detached form the part by cutting or breaking away the elongated support fixture.

The method of the current invention is practically well suited to sintering complex structures having independently movable interlocking parts that are required to maintain precise alignment during sintering in order prevent them fusing together. For example, the method is well suited for making ceramic turbine structures with an outer rotor and an interlocking movable shaft, described below. When using the invention to sinter complex structures with interlocking parts, independent support fixtures are attached to each part of the interlocking structure to maintain alignment during sintering.

DESCRIPTION OF THE FIGURES

FIG. 1A shows a side view of a part having an arbitrary shape, which can be made according to the present invention.

FIG. 1B shows support structure according to the present invention with elongated support fixtures for supporting the part shown in FIG. 1A.

FIG. 2 shows how a base and fixtures support the part.

DETAILED DESCRIPTION

Figure 3:
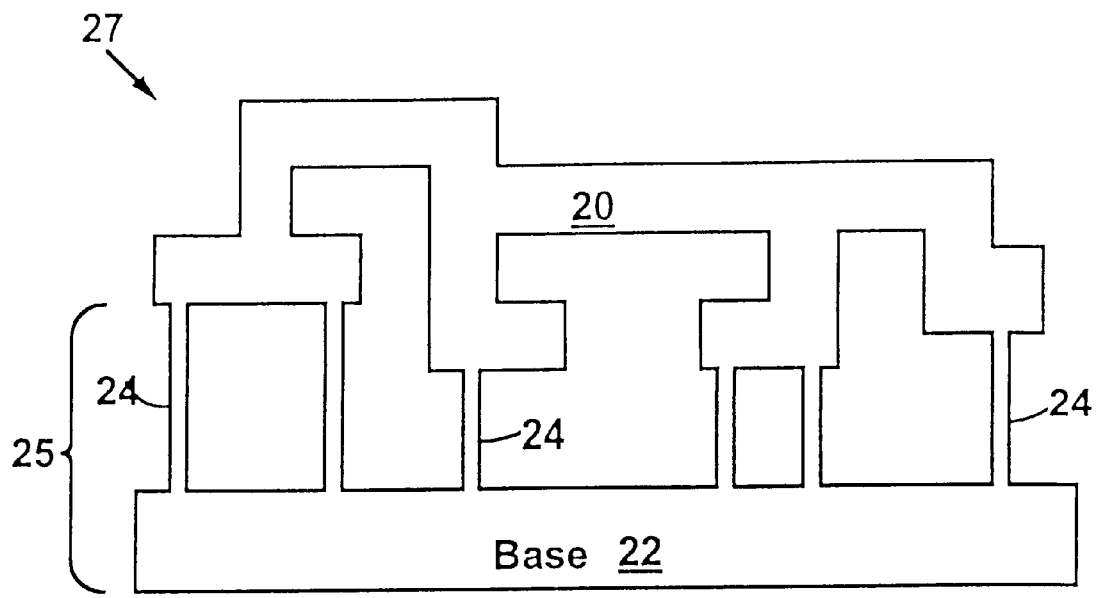
FIG. 3 shows the part after sintering.

The present invention provides a method of manufacturing complicated sintered structures, which overcomes the problems outlined above. The sintered structures can comprise several parts that have close spatial tolerance and/or are interlocking and independently movable. The advantages of the invention are achieved by virtue of a support structure formed form a green material which holds parts in their proper locations during the sintering process and prevents the parts from sagging, distorting and touching each other. The method of the invention is useful for sintering structures made from a variety of sinterable materials such as ceramic and metallic powders. More specifically, the present invention can be used with alumina, silicon nitride, aluminum, steels, stainless steels, tool steels and tungsten alloys. Further, while the description is restricted to green materials it will be clear to one of average skill in the art that the invention can be used for partially sintered structures or structure that have been otherwise modified before sintering.

FIG. 1A shows a side view 19 of an arbitrarily shaped green part 20, which can be sintered according to the present invention. The part 20 can be formed by any suitable method known in the art such as extrusion, molding or casting. The part is made of a sinterable material. The sinterable material is preferably a ceramic powder or metallic powder combined with an appropriate binder as described in the prior art, which is then formed into a green part such as 20.

FIG. 1B illustrates a side view 21 support structure 25 made in accordance with the present invention. The support structure has a base 22 and elongated support fixtures 24 extending from the base for supporting the part 20, shown in FIG. 1A. The fixtures 24 are preferably thin compared to the part 20 but can have any variety of shapes such as small diameter cylinders or extended sheets. The base 22 and the support fixtures 24 are formed from a sinterable material that is preferably the same composition as the sinterable part 20 wherein the support structure the part experience similar rates and degrees of shrinkage during the sintering process. However, it is considered to be within the scope of the present invention that the compositions of the support structure 25 and the part 20 differ from each other as long as their respective shrinkages remain similar. Further, it is not required in this particular embodiment that the support 25 and the part 20 are formed by the same methods.

FIG. 2 shows side view 26 of the part 20 aligned on the support structure 25 according to the present invention. The support fixtures 24 support the part 20 such that the support fixtures contact the bottom surfaces 26 of the part 20. The part 20 and the support structure 25 are then sintered. Sintering is typically accomplished at temperatures above $\frac{2}{3}$ of the melting point of the material being sintered. During the sintering process, both the part and the support structure will undergo shrinkage and the support structure 25 and the part 20 will fuse together the surface contacts 26.

FIG. 3 shows a side view 27 of the part 20 and support structure 25 of FIG. 2 after sintering. The part 20 and support structure 25 shrink by approximately the same proportion since both are made of similar material. Therefore, the part 20 does not experience distorting forces while shrinking and the shape of the part 20 tends to be maintained during sintering.

Figure 4A:
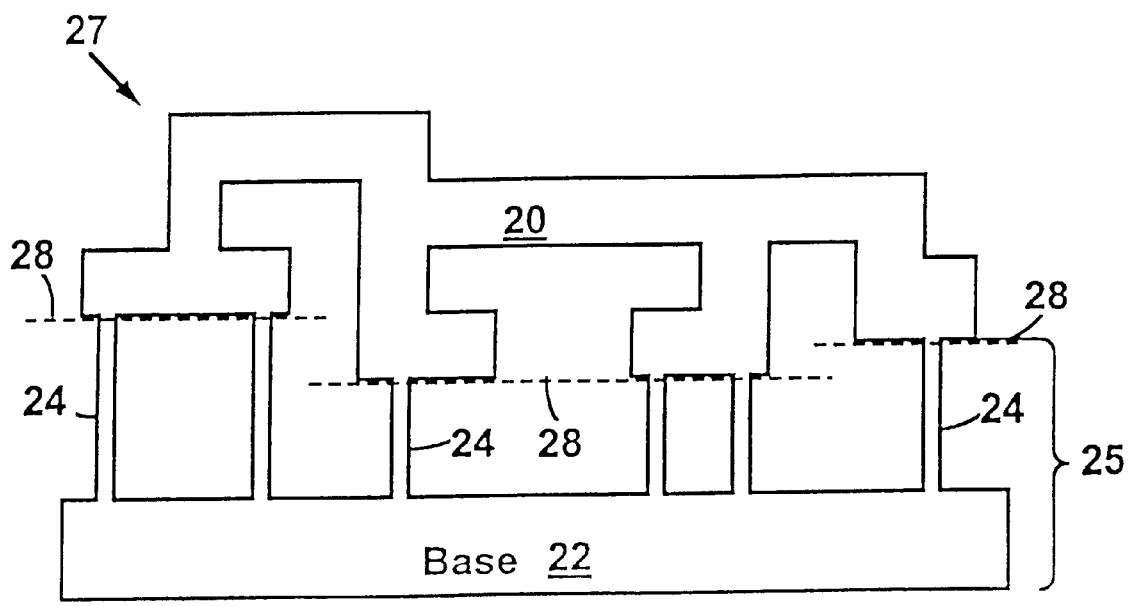
FIG. 4A shows how the part is separated from the fixtures and base.
Figure 4B:
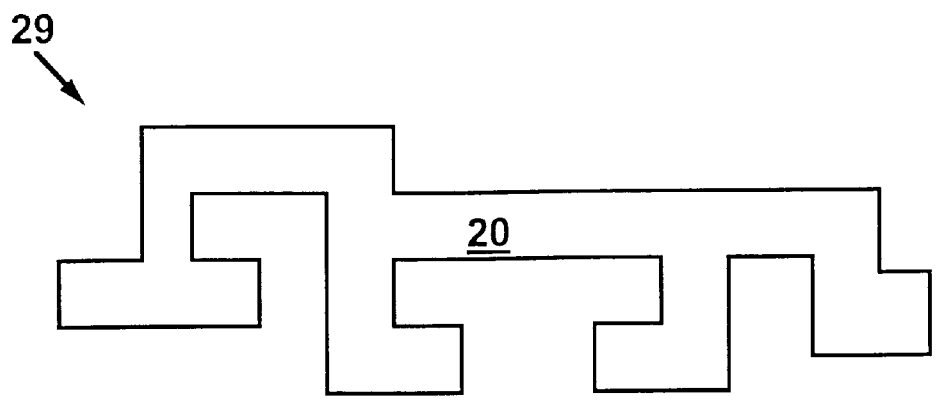
FIG. 4B shows the finished part, after the fixtures and base have been separated from the part.

Now referring to FIG. 4A, during sintering of the part 20 and the support structure 25 will be fused together. In order to free the sintered part 20, the support fixtures 24 are cut or broken away as shown as dotted lines 28. FIG. 4B shows the finished part 20 after the fixtures 24 and base 22 have been cut away.

In the most preferred embodiment of the invention, a green part, a base and support fixtures comprise a single piece of green material that forms a monolithic structure. The monolithic structure can be made using a variety of molding or casting techniques. Examples of processes which can be used to make the green mechanism include gelcasting, rapid prototyping techniques, Shape Deposition Manufacturing (SDM) and Mold Shape Deposition Manufacturing (Mold SDM). Mold SDM is the preferred method of making the monolithic structures. Reference can be made to copending patent application Ser. No. 60/061,616 filed Sep. 30, 1997, herein incorporated by reference, for information concerning Mold SDM. SDM is also quite suitable for making the green structures. Reference can be made to U.S. Pat. No. 5,301,415 concerning SDM. Gelcasting also has certain advantages. One of the advantages of gelcasting is that gelcasted green parts tend to shrink very isotropically during sintering. This minimizes warping which can be caused by anisotropic shrinking.

A significant advantage of making monolithic structures with a support structure incorporated is that it prevents the parts in a multiple part structure from touching and fusing together which usually renders the mechanism inoperable. Further, using this preferred embodiment of the invention does not require manual alignment of the individual parts or alignment of the parts on the support structure. This preferred embodiment is particularly useful for sintering complex structures with interlocking and movable interlocking parts that require astringent maintenance of part alignment during sintering. FIG. 5–11 will now be used to illustrate the particular advantages of the current invention for making sintered structures with interlocking parts.

Figure 5:
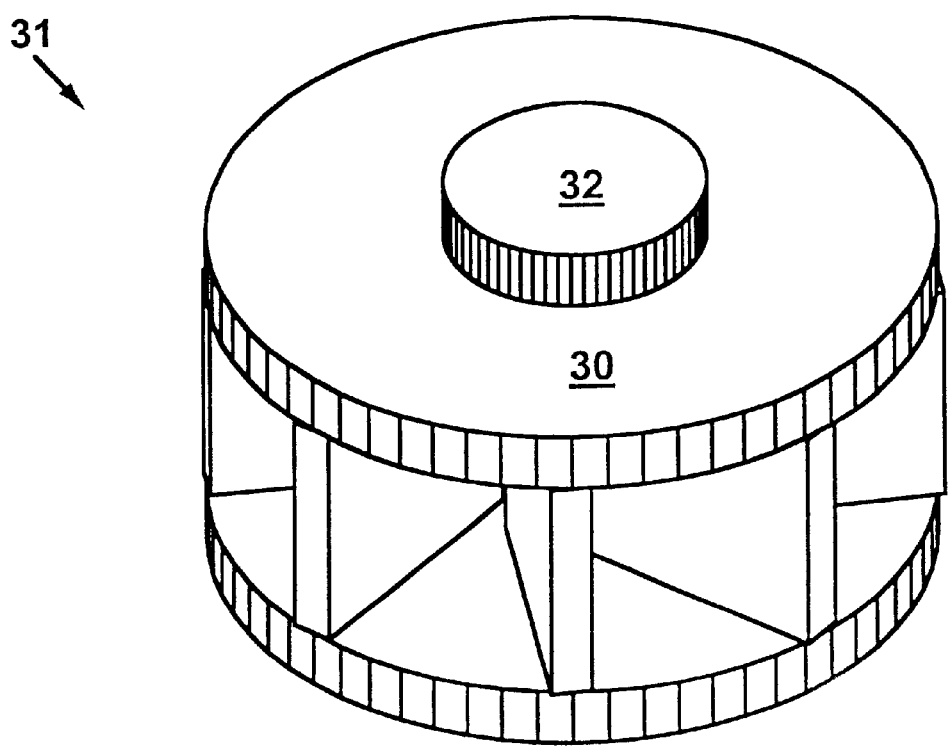
FIG. 5 shows a perspective view of a rotor and shaft mechanism, which can be made according to the present invention.

FIG. 5 shows a perspective view 31 of a rotor 30 fabricated around a shaft 32, which can be made according to the present invention. The rotor 30 is free to rotate on the shaft 32. The rotor and shaft are both made of sintered material, and are separate pieces. The rotor 30 and the shaft 32 each are monolithic parts. In other words, neither the rotor nor shaft has been made by joining smaller parts.

Figure 6:
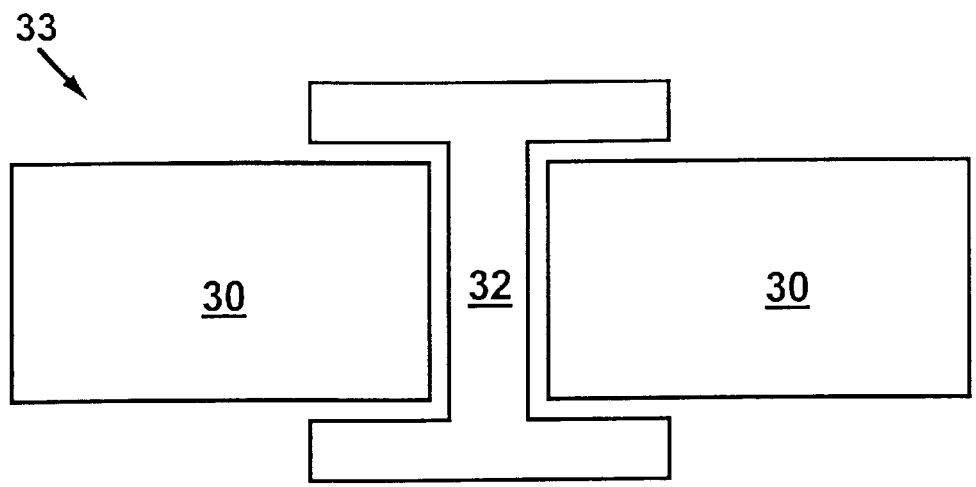
FIG. 6 shows a cross sectional side view of the rotor and shaft mechanism.

FIG. 6 shows a cross-sectional side view 33 of the rotor 30 mounted on the shaft 32. The rotor 30 and shaft 32 are separate and interlocking pieces, which can not be separated. The structure in FIGS. 5 and 6 can be made by the method of the present invention as illustrated below.

Figure 7:
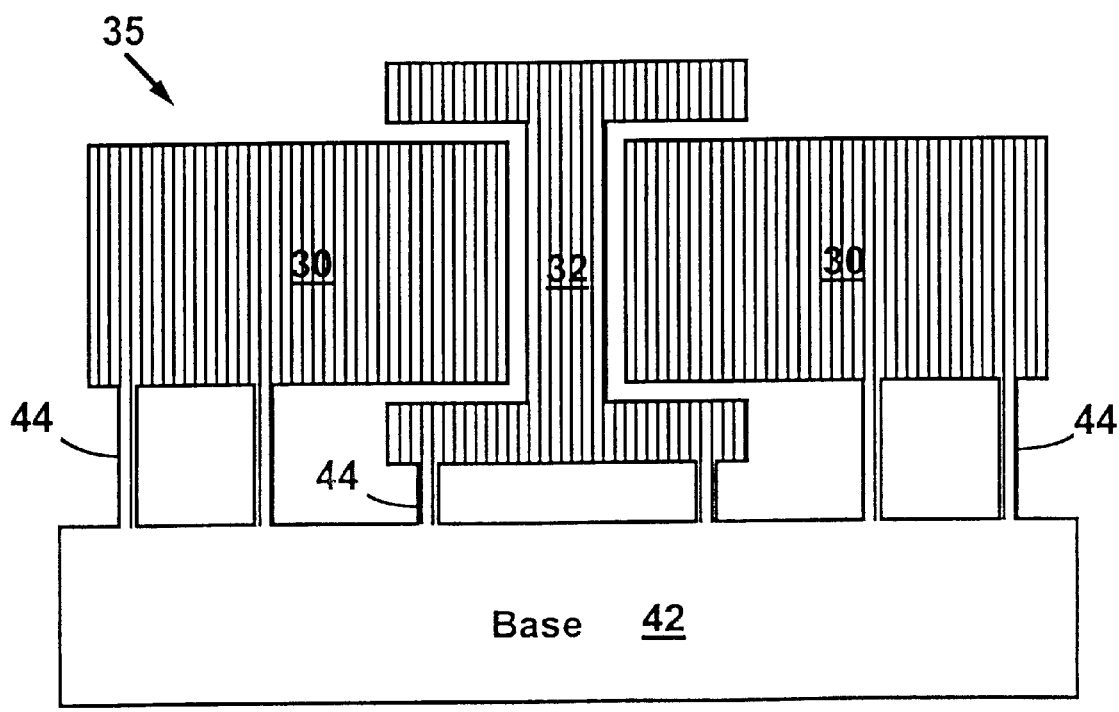
FIG. 7 shows a side view of how the rotor and shaft can be supported by fixtures and base.

Now referring to FIG. 7, the structure 35 has a rotor 30 and a shaft 32 attached to a base 42 by means of fixtures 44. The rotor 30, shaft 32, fixtures 44 and base 42 are all green and preferably are made of a single, monolithic piece of green sinterable material. The rotor 30 and shaft 32 do not touch. The fixtures 44 and base 42 hold the rotor and shaft 32 fixed with respect to one another, preventing the rotor and shaft from touching. When the mechanism of FIG. 7 is sintered, the rotor 30, shaft 32, fixtures 44, and base 42 all shrink at approximately the same rate and to the same degree, thereby maintaining the relative positions of the rotor 30 and shaft 32.

Figure 8:
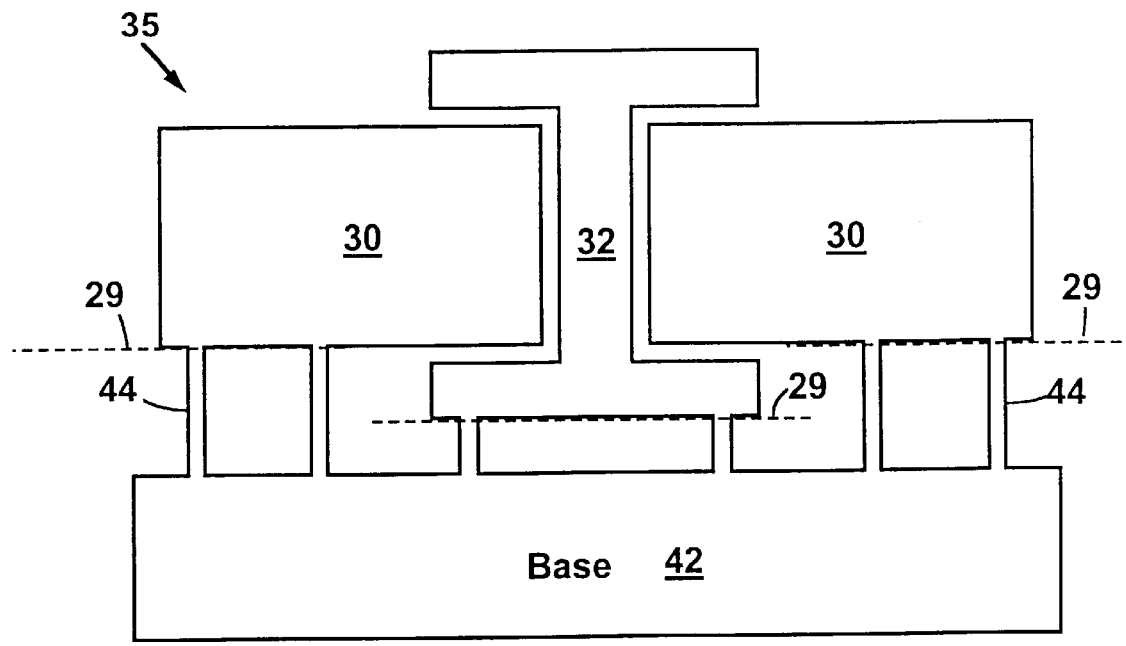
FIG. 8 shows the rotor and shaft mechanism after sintering, showing how the rotor and shaft are separated from the fixtures and base.

FIG. 8 shows the rotor/shaft structure 35 after sintering. The rotor 30 and shaft 32 are released from the fixtures 44 by cutting or breaking along the dotted lines 29. This renders the rotor and shaft as separate but interlocking pieces.

Figure 9:
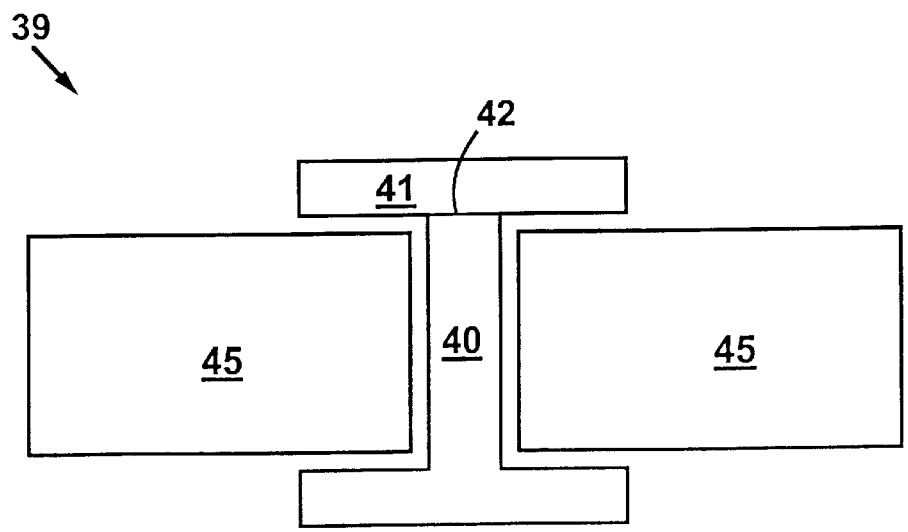
FIG. 9 is a side view of a prior art rotor and shaft mechanism in which the shaft is made of two fused parts.

FIG. 9 shows cross-sectional view rotor and shaft structure 39 similar to that described above, but formed by methods described in the prior art. The structure has a rotor 45 and a shaft made by joining parts 40 and 41. A shaft formed by fusing individual parts 40 and 41 is not as strong as a monolithic shaft 32 shown in FIGS. 6–8. Sintered materials are weakened by inhomogeneities such as may be present at a boundary 42 between the top part 41 and the spool part 40. Also, inhomogeneities can cause the boundary 42 to be more susceptible to failure at high temperatures. Parts, such as 40 and 41 are often fused by melting glass at the boundary 42. The glass acts as an adhesive. The glass necessarily has a lower melting point than the parts being joined. This results in the fused part having a lower strength at elevated temperatures compared to a monolithic part. The parts 41, 40 cannot be fused while they are green because there is no known technique for joining green parts.

Figure 10:
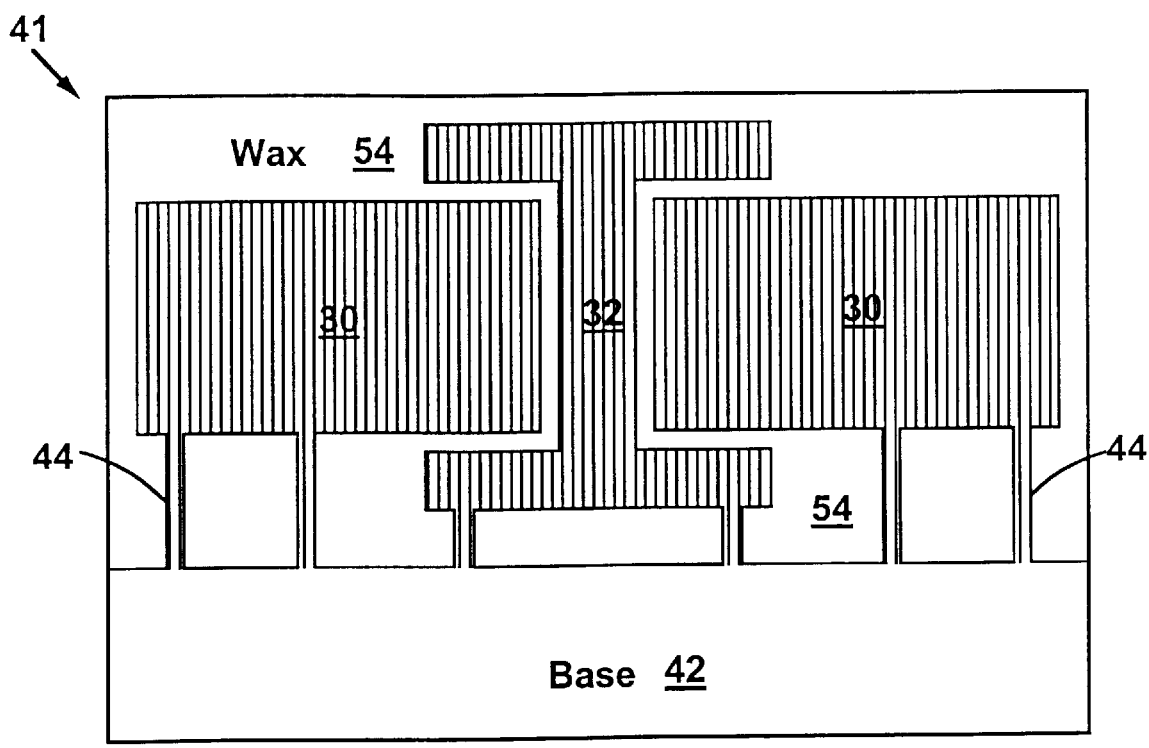
FIG. 10 shows a side view of the rotor and shaft mechanism embedded in wax before separating rotor and shaft from fixtures.

For very complex mechanisms, it may be difficult to cut away the support fixture since as parts of the mechanism are released they may move and interfere with subsequent fixture removal steps. Also, for delicate parts the act of cutting the fixtures may damage the part if the part has to bear the cutting forces. To avoid these kinds of problems, the sintered mechanism can be embedded in a temporary support material such as wax. FIG. 10 shows a side view 41 of the sintered rotor/shaft mechanism shown in FIG. 8 which has not been released from the fixture supports 44 or the base 42. In this particular embodiment of the invention the structure is embedded in wax 54 prior to the step of releasing the parts from the fixtures 44. The wax 54 holds the shaft 32 in place until all the fixtures 44 and the base 42 are cut away. Then, the wax is removed by melting or with a solvent. Alternatively, jigs or clamps are used to hold parts in place until the fixtures are cut away.

Figure 11:
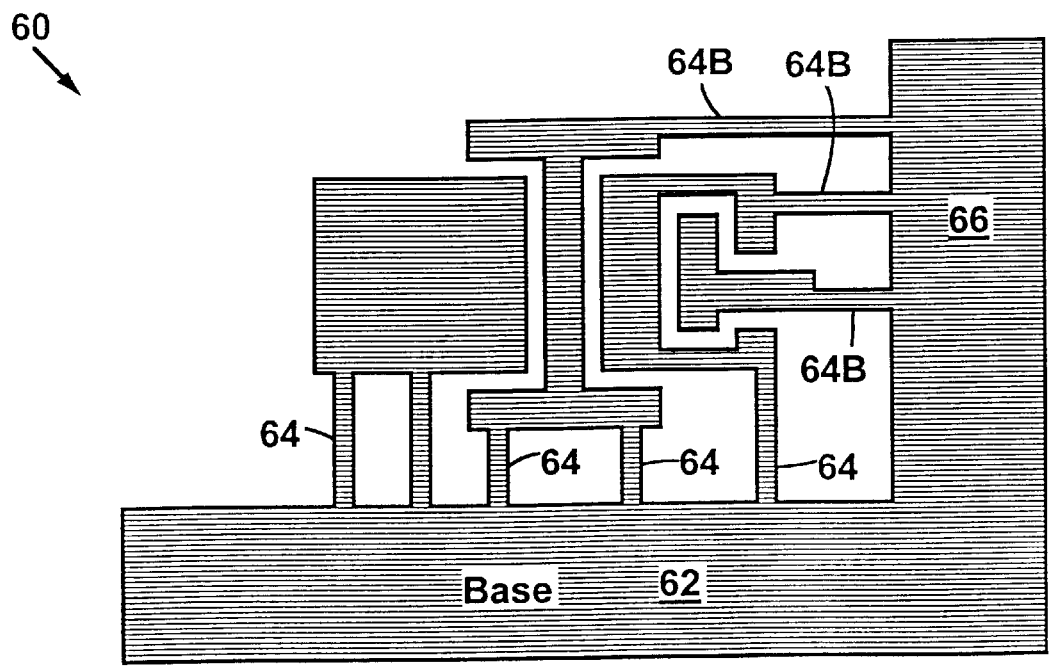
FIG. 11 shows an alternative embodiment in which the base extends vertically to support parts with horizontal fixtures.

FIG. 11 shows side view 60 of an alternative embodiment of the present invention in which the base 62 has a base side-wall 66 for supporting a complex mechanism. The monolithic structure has vertical fixture 64 similar to those previously described and also fixtures 64B that extend horizontally from the side-wall 66.

It will be clear to one skilled in the art that the above embodiment may be altered in many ways without departing from the scope of the invention. Accordingly, the scope of the invention should be determined by the following claims and their legal equivalents.

What is claimed is:

1. A method of sintering a part, the method comprising the steps of:

a) forming a monolithic structure comprising a support base, a plurality of support fixtures extending from said support base, and a first part attached to said support fixtures, wherein said monolithic structure is formed from a sinterable material and said support fixtures preserve shape and maintain alignment of said first part during sintering;

b) sintering said monolithic structure; and c) separating said first part from said support fixtures after said sintering.

2. The method of claim 1 wherein said step a) of forming said monolithic structure comprises the steps of:

a) injecting said sinterable material in a mold;

b) releasing said monolithic structure from said mold.

3. The method claim 1, wherein said support fixtures are thin elongated support fixtures.

4. The method of claim 1 wherein said sinterable structure is a green structure formed from a sinterable material.

5. The method claim 1, wherein said monolithic structure further comprises a second part attached to said base by at least one of said support fixtures.

6. The method of claim 5, wherein said first part and said second part form an interlocking structure.

7. The method of claim 1, further comprising the step d) embedding said monolithic structure in wax prior to step c) of separating said first part from said support fixtures.

* * * * *